Nov. 2, 1954 H. W. LORD 2,693,508

MAGNETIC RECORDING, REPRODUCING OR ERASING HEAD

Filed Nov. 13, 1948

Inventor:
Harold W. Lord,
by Richard E. Hosley
His Attorney.

United States Patent Office 2,693,508
Patented Nov. 2, 1954

2,693,508

MAGNETIC RECORDING, REPRODUCING OR ERASING HEAD

Harold W. Lord, Schenectady, N. Y., assignor to General Electric Company, a corporation of New York Application November 13, 1948, Serial No. 59,874

6 Claims. (Cl. 179—100.2)

Figures 1, 2, 3, 4, 5, 6, 7:
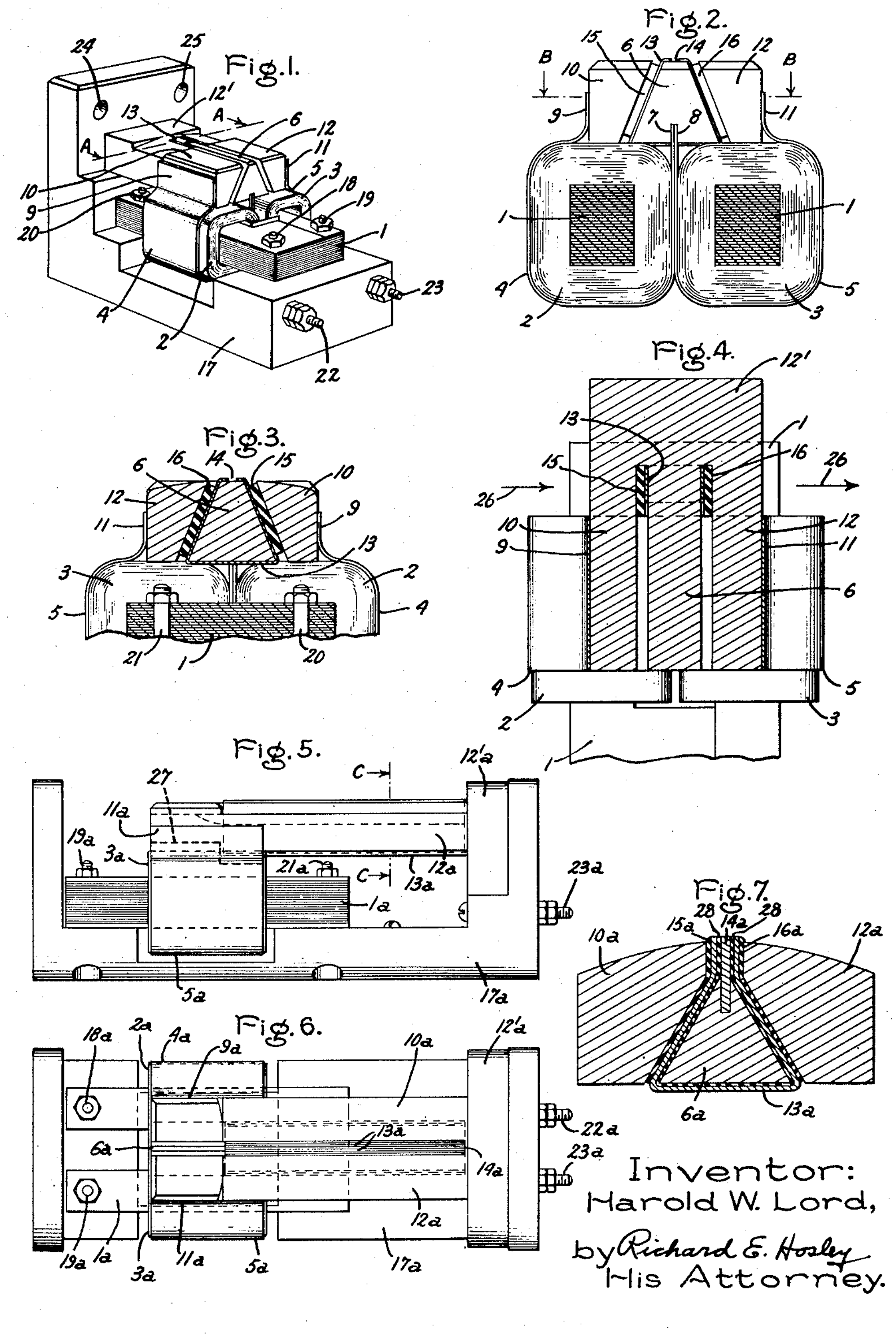

My invention relates to magnetic recording, reproducing and erasing heads and more particularly to such heads providing high intensity magnetic fields for use with a magnetic recording medium.

An object of the invention is to provide a magnetic recording or erasing head for producing a high intensity magnetic field.

Another object is to provide a practicable head for recording or erasing a signal on a magnetic recording medium of high coercivity.

An additional object is to reduce the losses in a magnetic recording, reproducing or erasing head.

A still further object is to increase the flux across the gap of a recording or erasing head for magnetic recording systems. Another object is to provide a head adapted to recording and reproducing wherein the reluctance of the magnetic path is minimized.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 is a perspective view, Fig. 2 a partial end view, Fig. 3 a section view along line A—A of Fig. 1 and Fig. 4 a sectional view along line B—B of Fig. 2, of a recording or erasing head according to the invention, and Figs. 5 and 6 are side and top views respectively, and Fig. 7 a sectional view along line C—C of Fig. 5, of a modified head particularly adapted to use with wide magnetic recording tapes.

A head according to the invention may comprise a transformer having a multiple turn primary winding, a single turn secondary winding, and a heavy copper bus system completing the circuit of the secondary turn and linking a magnetic loop which has a non-magnetic gap portion for cooperating with the recording medium.

The head shown in Fig. 1 specifically comprises a laminated generally rectangular core member 1 about the opposed longer legs of which are wound multiple turn primary coils 2 and 3 connected in series or parallel as desired and polarized to aid in providing flux in the core in response to an applied input signal. The primary coils are insulated in any conventional manner, and about each of the two coils is a single turn secondary comprising, in each case, a heavy strap or sheet preferably of copper, strap 4 being wrapped about coil 2 and strap 5 about coil 3.

Above the transformer is a generally E-shaped bus structure, preferably of copper, to the middle leg 6 of which are connected to adjacent ends 7 and 8 of straps 4 and 5, respectively. Ends 7 and 8 may be inserted and soldered into a longitudinal groove cut in the underside of leg 6. From ends 7 and 8 the straps extend downwardly through the open center of the core between the primary windings, outwardly in opposite directions under the primary windings and then upwardly toward the outer legs of the bus structure, the end 9 of strip 4 being connected by soldering to leg 10 and the end 11 being similarly connected to leg 12. This construction so polarizes the secondary strap windings that ends 9 and 11 are of the same polarity and the application of a signal voltage to the primary winding induces a heavy current flow into and out of the center leg 6 between the interconnected ends 7, 8 and the outer ends 9 and 11 through the bus structure.

This current will, of course, traverse the base portion 12' of the bus structure.

The heavy current in the center leg 6 of the bus structure links a magnetic loop 13 surrounding the leg. It has been found convenient to form loop 13 of a strip of magnetic material which is wrapped tightly about the center leg as best shown in Figs. 2 and 3. As shown in these figures, which are, respectively, an end view of the coil and bus structure from the end thereof exposed in Fig. 1, with the core legs in section, and a sectional view taken along line A—A of Fig. 1, the loop 13 is provided with a gap portion 14, which may be an air gap, a gap filled with an insulating medium or a gap in which a copper shim or spacer is inserted. Insulating plugs 15 and 16 are wedged into place to hold the magnetic strap securely in place.

It will be recognized that the parts of the device shown in Figs. 2 and 3 bear the numeral designations applied to the same parts as shown in Fig. 1 in accord with the above description.

The bus structure described as E-shaped may be machined from a solid block of copper by making saw or milling machine cuts to separate the legs 6, 10 and 12, the cuts extending to a depth less than the length of the block to leave a solid base portion 12'. The cuts are preferably made at an angle to the top face of the block as shown, whereby the cross sectional shape of the center leg is that of an isosceles trapezoid of which the upper side is the shortest side. The magnetic gap may then be formed as shown on this short side. Other cross sectional shapes are satisfactory, however, and will depend upon manufacturing convenience, upon the desirability of long or short contact of the magnetic pole portions with the magnetic recording medium, and upon other similar considerations.

It is to be noted that the head described will be operative, though somewhat less efficiently, if one primary coil such as coil 2 is omitted, or if one strap such as strap 4 and its corresponding outer bus leg 10 are omitted, or if one primary coil such as coil 2, and either strip 4 or 5 and its associated outer leg are all omitted. It is important, however, that a heavy current secondary winding be provided which links the magnetic loop, the loop being fitted closely around a portion of the heavy secondary coil itself or a part of a circuit completing link or bus for the coil, or that the coil or circuit completing bus be fitted closely into the magnetic loop, whereby the full current of the secondary must pass through the magnetic loop in a location physically close to the gap portion.

Fig. 4 is a sectional view of the device shown in Figs. 1–3, taken along line B—B of Fig. 2, in which the parts of the device have been numbered to correspond to the numbering of Figs. 1–3. The magnetic loop 13, shown in cross section, is seen to comprise a strap-like member disposed in the bus leg separating slots immediately adjacent the base 12' of the bus structure. The current path through the bus structure for a predetermined half-cycle of input signal in the primary coils will be out of leg 6 through the portion linking magnetic loop 13 and into base portion 12', wherein the current splits, approximately half flowing into leg 10 to end 9 of secondary turn 4 and the other half into leg 12 to end 11 of turn 5. On the next half cycle, the directions of current flow will be reversed.

Further elements and details of the device of Figs. 1–4 are shown, which comprise a supporting base 17, preferably formed of insulating material such as a phenolic resin and to which the core 1 may be bolted by bolts 18, 19, 20 and 21 positioned as shown in Figs. 1 and 3, the bolts serving also to hold together the laminations of core 1. Also shown are terminals 22 and 23 for the primary coils. The base 12' of the bus structure is supported on a suitably shaped portion of the supporting base 17 and is cemented or glued thereto for the sake of rigidity. Mounting holes 24 and 25 may be provided in a desired location in the supporting base.

As shown in Figs. 1 and 3, the portion of the upper surface of the bus structure adjacent the operating gap 14 is beveled or rounded to provide a path in which the tape or other recording medium may travel. While the recording medium has not been shown in the drawings, it will be understood that the medium may be drawn across the gap portion 14 of the magnetic loop 13 in a direction of travel perpendicular to the axis of leg 6 as indicated by arrows 26 in Fig. 4. These arrows may coincide with the center line of the medium.

The head of Figs. 1–4 is adaptable to reproducing a signal from a magnetic recording medium with the particular advantage of providing a short magnetic path, which has a correspondingly low reluctance. It will be understood that wherever herein the windings of the transformer are described as primary and secondary windings of a recording or erasing head, the primary becomes the secondary winding when the head is used for reproducing. It will be further apparent that the term "magnetic recording head" is intended to describe a head useful in a magnetic recording system to perform a recording, a reproducing or an erasing function.

While the head of Figs. 1–4 is particularly adapted to use with a narrow tape recording medium, it will be immediately apparent to those skilled in the art, that it may be used either in its present form or with a magnetic loop modified in dimensions, in accord with well understood principles of magnetic recording heads, for recording or erasing a wire medium or a wide tape medium, or even with a medium in the shape of a drum or disc.

While it is believed that such modifications as may be desirable to adapt the head to use with other forms of recording media can be readily accomplished by those skilled in the art, it has been found that the principles of the invention may be applied with great advantage to wide recording tapes an inch or more in width and, accordingly, a modified construction is shown in Figs. 5, 6 and 7, Fig. 5 being a side view, Fig. 6 a top view and Fig. 7 a sectional view of the bus structure, taken at line C—C of Fig. 5 and showing the bus legs in the portion including the magnetic loop and operating gap, of a recording or erasing head for a wide tape medium.

In Figs. 5–7, parts of the modified head which correspond to similar parts of the head of Figs. 1–4 are identified by the same numerals with the subscript "*a*" added.

Referring now to Figs. 5 and 6, the modified device comprises a laminated core 1*a*, a pair of primary coils 2*a* and 3*a* arranged on the side legs, and single turn strap secondary windings 4*a* and 5*a* disposed about the primary windings in substantially the same manner as described above for corresponding portions of Figs. 1–4. The outer ends 9*a* and 11*a* of straps 4*a* and 5*a* are soldered to outer copper bus legs 10*a* and 11*a* in substantially the same manner as in Fig. 1, but the inner ends of the straps are reduced in width by approximately one-third and contact the center leg 6*a* of the bus structure from the end thereof to the left of Figs. 5 and 6 only up to the loop structure. The shape of the inner interconnected ends of the straps is indicated by dotted line 27 of Fig. 5. The connection of the reduced ends of the straps to leg 6*a* may be as shown in Fig. 2. The magnetic loop member 13*a* extends from the end of center leg 6*a* at bus portion 12'*a* up to, substantially, the position of the discontinuity of the strap ends as shown by the vertical portion of dotted line 27 in Fig. 5. It will be now seen that the bus structure is formed in this modification with considerably longer leg portions 6*a*, 10*a*, and 12*a* than the corresponding legs of Figs. 1–4, and that a greater portion of the length of the center leg 6*a* is surrounded by the magnetic loop.

The magnetic loop 13*a* as shown in Fig. 7 is separated from center leg 6*a* about which it is tightly formed by a thin sheet 28 of insulating material if desired, and held in place by sheets 15*a* and 16*a* disposed between member 13*a* and legs 10*a* and 12*a* respectively. It has been found desirable under certain conditions wherein the poles bounding the operative gap portion of the magnetic loop are subject to excessive wear to turn up the pole portions as shown in Fig. 7 rather than turning them in as in Fig. 3 at the gap portion. In the embodiment of Fig. 7, a copper spacer 14*a* is provided in the "air" gap of the magnetic loop. Insulation sheets 28 may be used on either side of the copper spacer as shown if desired, though it is not necessary to insulate the magnetic loop member 13*a* from the copper spacer and from the center leg 6*a* if it is insulated from outer legs 10*a* and 12*a*. Similarly, insulation from legs 10*a* and 12*a* is not necessary if insulation is provided for the magnetic loop member from the center leg and spacer.

The top of legs 10*a* and 12*a* is rounded or beveled downwardly from the portions adjacent the gap 14*a* to the outer edges as shown in Fig. 7. The rounded or beveled portions of these legs extend from base portion 12'*a* of the bus throughout the distance along the center leg which is surrounded by the magnetic loop member 13*a*.

The transformer core 1*a* is supported on base member 17*a*, which in this modification is generally cylindrical in shape, held by bolts such as those shown at 18*a*, 19*a* and 21*a* as in the device of Fig. 1, and the base portion 12'*a* of the bus structure may be cemented in place as before. Connections 22*a* and 23*a* for the primary coils are similarly provided, as are suitable means for external mounting such as the equivalent of holes 24, 25 in Fig. 1, though such means are not shown in Figs. 5–7.

While the magnetic loop 13 of the device of Figs. 1–4 and the loop 13*a* of the device of Figs. 5–7 are shown as comprising a single strap or sheet of magnetic material, the loop may be formed of a laminated sheet or strap to reduce core losses therein.

The operation of the modified head is substantially the same as that of Fig. 1 and a repetition thereof is not necessary to a complete understanding of the operation and function of the various portions of the head. In accord with either of the designs shown, a heavy current links the magnetic loop close to the gap portion and forces an intense flux to bridge the gap. This intense flux may be used to provide a magnetic recording on the recording medium traveling across the gap, or to erase previous recordings thereon. Erasure may be effected by applying an alternating voltage to the primary coils, preferably of high frequency as is common in the art, and recording may be accomplished by applying the signal to be recorded to the windings together with a high frequency biasing voltage, as is also common practice. The large turn ratio between the primary and secondary windings of the transformer provides for high impedance input to the primary coils although the secondary circuits are, of course, of very low impedance, the secondary turns and bus legs forming substantially short-circuit loops or turns about the transformer legs. Reproducing with either head is accomplished by connecting coils 2 and 3, or 2*a* and 3*a* to a suitable amplifier and loudspeaker or the like.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. A head for use in magnetic recording systems, said head comprising a transformer having a multiple turn primary winding, a conductive strap member wrapped about said primary winding and forming a single turn secondary winding, a short, heavy bus member connected between the ends of said strap to complete the circuit of said secondary winding, and a magnetic loop closely surrounding said bus member and linked thereby, said loop comprising a non-magnetic gap portion adapted to be spanned by a magnetic recording medium.

2. A head for use in a magnetic recording system, said head comprising a transformer core having two substantially parallel leg portions, a multiple turn primary winding about each of said respective parallel leg portions, a single turn secondary winding about each of said respective leg portions, a conductive bus structure connected in series with each of said respective single turns completing the circuits thereof, and a loop of magnetic material disposed about said bus structure thereby to be linked with said circuits, said loop having a non-magnetic gap portion.

3. A magnetic recording or erasing head comprising a transformer core, a multiple turn primary coil for exciting said core, a pair of closed circuit single turn secondary windings linked by said core, said windings having a common portion linking a magnetic loop member, said windings being poled with respect to said core and said common portion to mutually aid the current in said common portion, and said loop member having a non-magnetic gap portion adapted to be spanned by a magnetic recording medium.

4. A magnetic recording or erasing head comprising a transformer core, a multiple turn primary winding on said core, a conductive strap wrapped about said winding to form less than a complete turn around said winding and having extended end portions, a bus member disposed between said end portions to complete said turn, and a magnetic loop linking said complete turn and defining a non-magnetic gap portion adapted to be bridged by a magnetic recording medium.

5. A magnetic recording or erasing head comprising a heavy conductive bus structure, said structure comprising a base from which extend three substantially parallel and substantially coextensive legs, means for providing a heavy current flow between a portion of one of said legs remote from said base and the others of said legs, and a magnetic loop surrounding said one of said legs intermediate said portion thereof and said base thereby to be linked by said current, said loop comprising an operative non-magnetic gap adapted for cooperation with a magnetic recording medium.

6. An applicator for a magnetizable record, said applicator comprising a first non-ferrous U-shaped member, said member having a face portion disposed for presentation to said record, a U-shaped conductive member substantially perpendicular to said first member coupled to the ends of said first member to form a closed conductive loop, and a thin strap of ferromagnetic material partially surrounding a portion of said non-ferrous member to link said loop.

References Cited in the file of this patent

UNITED STATES PATENTS

| Number | Name | Date |
|---|---|---|
| 2,418,542 | Camras | Apr. 8, 1947 |
| 2,469,444 | Roys | May 10, 1949 |
| 2,479,308 | Camras | Aug. 16, 1949 |
| 2,483,398 | Brastad | Oct. 4, 1949 |
| 2,523,576 | Kornei | Sept. 26, 1950 |
| 2,536,272 | Friend | Jan. 2, 1951 |
| 2,539,400 | Camras | Jan. 30, 1951 |
| 2,547,297 | Wiegand | Apr. 3, 1951 |
| 2,591,070 | Howell | Apr. 1, 1952 |

FOREIGN PATENTS

| Number | Country | Date |
|---|---|---|
| 612,450 | Germany | Apr. 25, 1935 |